US012807457B2

(12) United States Patent
Wenlin et al.

(10) Patent No.: US 12,807,457 B2
(45) Date of Patent: Nov. 24, 2026

(54) ELEVATOR SYSTEM AND METHOD OF MONITORING

(71) Applicant: KONE Corporation, Helsinki (FI)

(72) Inventors: Henri Wenlin, Helsinki (FI); Tapani Talonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 486 days.

(21) Appl. No.: 18/432,514

(22) Filed: Feb. 5, 2024

(65) Prior Publication Data

US 2024/0174484 A1 May 30, 2024

Related U.S. Application Data

(63) Continuation of application No. PCT/EP2021/075517, filed on Sep. 16, 2021.

(51) Int. Cl.
*B66B 5/00* (2006.01)
*B66B 1/32* (2006.01)
*B66B 1/34* (2006.01)

(52) U.S. Cl.
CPC .............. *B66B 5/0025* (2013.01); *B66B 1/32* (2013.01); *B66B 1/3461* (2013.01); *B66B 5/0037* (2013.01)

(58) Field of Classification Search
CPC ....... B66B 5/0025; B66B 5/0037; B66B 1/32; B66B 1/3461
USPC .......................................................... 187/391
See application file for complete search history.

(56) References Cited

U.S. PATENT DOCUMENTS

| | | | | |
|---|---|---|---|---|
| 11,827,222 | B2 * | 11/2023 | Hirose | B60W 30/18109 |
| 12,246,948 | B2 * | 3/2025 | Bewersdorf | B66B 5/027 |
| 2020/0062544 | A1 * | 2/2020 | Sudi | G01P 15/18 |

FOREIGN PATENT DOCUMENTS

| | | | | |
|---|---|---|---|---|
| CN | 105984775 | B | * | 8/2020 |
| JP | 2004123270 | A | * | 4/2004 |
| JP | 2005247468 | A | * | 9/2005 |

OTHER PUBLICATIONS

International Search Report (PCT/ISA/210) issued in PCT/EP2021/075517, dated Jun. 10, 2022.
Written Opinion of the International Searching Authority (PCT/ISA/237) issued in PCT/EP2021/075517, dated Jun. 10, 2022.

* cited by examiner

*Primary Examiner* — Jorge L Carrasquillo
(74) *Attorney, Agent, or Firm* — Birch, Stewart, Kolasch & Birch, LLP

(57) ABSTRACT

An elevator system includes an elevator car, and a hoisting machine moving the elevator car in a hoistway. To simplify maintenance work of the hoisting machine, the elevator system includes an acceleration sensor connected to the hoisting machine, and a computing unit which is responsive to a signal provided by the acceleration sensor and which sends condition data based on a predetermined processing of the signal.

19 Claims, 2 Drawing Sheets

ELEVATOR SYSTEM AND METHOD OF MONITORING

CROSS REFERENCE TO RELATED APPLICATIONS

This application is a Continuation of PCT International Application No. PCT/EP2021/075517, filed on Sep. 16, 2021, which is hereby expressly incorporated by reference into the present application.

BACKGROUND OF THE INVENTION

Field of the Invention

This invention relates to an elevator system and to a method of monitoring an elevator system. More particularly, the invention relates to a solution which improves the efficiency of maintenance work.

Description of Prior Art

Previously there is known an elevator system with an elevator car and a hoisting machine moving the elevator car in a hoistway. In order to facilitate that the elevator can stop and remain still at a correct position when needed, the hoisting machine is provided with a brake having a brake armature moving into brake position to reduce the speed of the elevator car. When braking is not needed, the brake armature moves into a release position.

A problem with a solution as described above, is that during use, the components of the hoisting machine are subjected to wear. Consequently, maintenance work is needed to regularly check that the brakes and other components of the hoisting machine, such as a bearing supporting the hoisting machine on an electrical motor, remains in good condition.

During maintenance work of the brake, an air gap at the brake armature of the brake is measured with a slit interpreter to determine the size of the air gap which correlates to a distance the brake armature has to move. In order to operate properly, this air gap needs to be kept at an acceptable size. Consequently, once the size of the air gap is no longer acceptable, renewal or adjustment of brake components is needed. Additionally, during maintenance work it is also necessary to check the condition of the bearing and other components of the hoisting machine in order to detect possible wear which eventually may affect the operation of the elevator car.

A drawback with the above described solution is that regular checking of the condition of the hoisting machine is a laborious and slow operation, in particular, as it requires substantial preparation to get access to the components.

SUMMARY OF THE INVENTION

An object of the present invention is to solve the above-mentioned drawback and to provide a solution which significantly simplifies the maintenance work of a hoisting machine in an elevator system. This object is achieved with an elevator system according to independent claim 1 and with a method according to independent claim 10.

When an accelerometer sensor connected to the hoisting machine is utilized to generate a signal which is processed to provide condition data, this condition data can be utilized to determine the condition of the hoisting machine. This significantly simplifies the maintenance work of the hoisting machine, as it becomes possible to determine the condition of the components of the hoisting machine without a need to get direct access to the components of the hoisting machine. By means of the invention, a more silent elevator hoisting machine may also be achieved.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
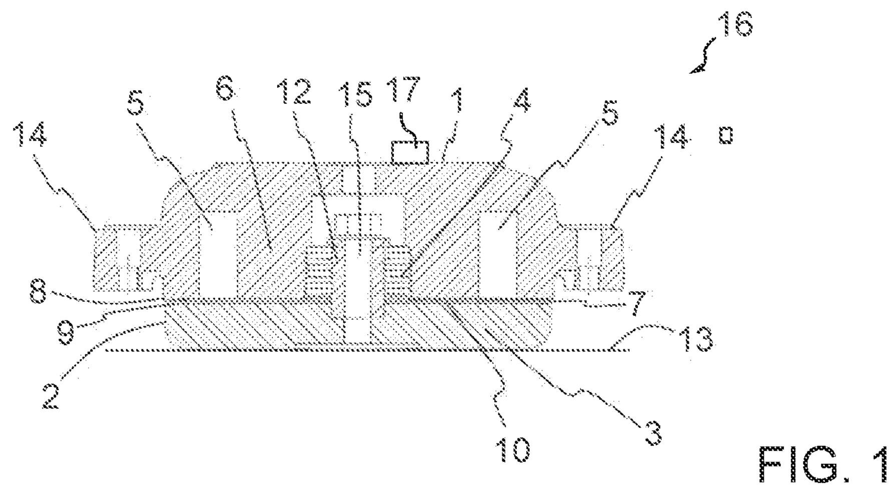
FIG. 1 illustrates a brake of a hoisting machine.

FIG. 1 illustrates a brake 16 of an elevator system. The illustrated brake is a brake for an elevator hoisting machine. In FIG. 1 the frame part 1 of the brake 16 is secured by mounting lugs 14 to a stationary machine frame of the hoisting machine. The frame part 1 is provided with an electromagnet, which comprises a magnetizing coil 5 and a coil core 6 made of iron. The armature 2 of the brake is movably secured to the frame part 1 with a bolt 15 and a sleeve 12 around the bolt 15, so that the armature 2 can move along a determined path relative to the frame part 1. By moving the sleeve 12 along the bolt 15, it is also possible to adjust the distance of movement of the armature part 2, thereby adjusting the air gap 10 between the armature 2 and the frame part 1. Springs 4 apply a pushing force between the frame part 1 and the armature 2, so that the brake is activated to move into a brake position to brake the motion of the rotating part of the hoisting machine and to reduce the speed of an elevator car when the springs 4 press the armature 2 against the brake drum 13 of the rotating part of the hoisting machine. The range of action of the springs 4 is so designed that the pushing force generated by the springs 4 is constant with respect to the path of the armature 2 or that only a small change in the pushing force occurs when the position of the armature 2 changes. The brake is deactivated into a release position by supplying current to the magnetizing coil 5 of the electromagnet; the current flowing in the coil 5 produces a force of attraction between the coil core 6 and the magnetic core 3 of the armature part made of magnetizable material, thus pulling the armature 2 out of contact with the brake drum 13 by counteracting the pushing force of the springs 4.

When the brake 16 is deactivated into the release position and the armature 2 starts moving towards the frame part 1, the force of attraction applied to the armature 2 by the electromagnet begins to grow, because the air gap 10 between the coil core 6 and the magnetic core 3 in the brake magnetic circuit begins to decrease at the same time. Due to the increasing force of attraction, the kinetic energy of the armature part 2 tends to grow high, which results in an impact of the armature 2 against the frame part 1 of the brake.

In FIG. 1 the brake 16 of the hoisting machine is provided with an acceleration sensor 17, which is connected to the brake 16 of the hoisting machine. FIG. 1 illustrates the connection and the position of the acceleration sensor schematically, in practical implementations the connection and position of the acceleration sensor to the brake may be done in several alternative ways. One alternative is that the acceleration sensor is not connected to the brake itself, but to the hoisting machine in which the brake is installed. In any case, the acceleration sensor 17 is capable of providing a signal when the brake armature 2 moves. Additionally, the same acceleration sensor may also be capable of providing signals caused by movement of other components of the hoisting machine.

Depending on the implementation the signal from the acceleration sensor may be utilized to register the actual movement of the armature 2, such as the duration of the time period movement occurs, or alternatively, this signal may be utilized to register the magnitude of the impact of the armature 2 when the movement comes to an end. It may be possible to register and utilize the signal in both movement directions of the brake armature 2, such as from the release position to the brake position and from the brake position to the release position. However, even if a signal capable of being utilized can be obtained only in one movement direction, this signal can be processed to obtain condition data.

Figure 2:
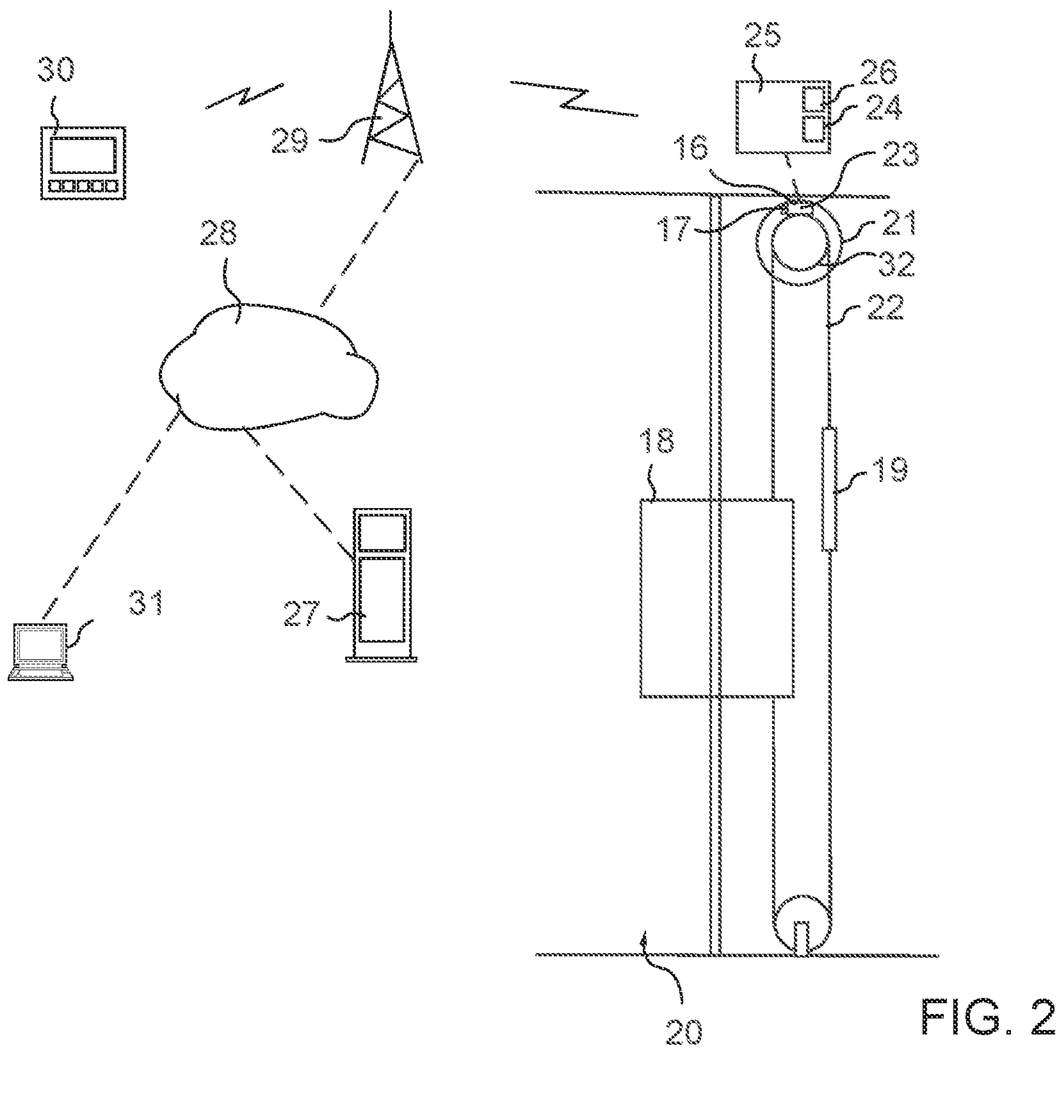
FIG. 2 illustrates an elevator system.

FIG. 2 illustrates a simplified illustration of an elevator system with a hoisting machine 21 having an acceleration sensor 17. In FIG. 2 it is by way of example assumed that the acceleration sensor 17 is connected to the brake 16, which may be similar as the brake 16 illustrated in FIG. 1. However, alternatively, the acceleration sensor 17 may connected to some other part of the hoisting machine than to the brake.

Irrespectively of the exact location of the acceleration sensor in the hoisting machine, this sensor is capable of providing a signal correlating to the condition of the hoisting machine. Abnormalities in the signal as compared to signals obtain earlier in time, such as immediately after maintenance work of the hoisting machine in question, can be utilized to detect wear in the components of the hoisting machine, such that it becomes possible for maintenance personnel to determine when the next maintenance stop should be implemented for the hoisting machine in question.

The illustrated elevator system comprises an elevator car 18 and a counterweight 19 which are moved in an elevator hoistway 20 between floors of a building, for instance. The hoisting machine 21 moves the elevator car 18 and the counterweight in the hoistway by means of ropes 22 running via a traction sheave 32 of the hosting machine 21. The traction sheave 32 of the hoisting machine 21 is rotatably supported on a body of an electrical motor by means of a bearing.

In the example of FIG. 2, the hoisting machine is provided with a brake unit 23 which includes one or more brakes 16, as illustrated in FIG. 1, such as two, three or four brakes 16, distributed at different positions within the hoisting machine to provide adequate and reliable braking under control of a brake control circuit 24, which by example is located in a control cabinet 25 in FIG. 2, though it may be located elsewhere in other implementations.

The elevator system is also provided with a computing unit 26, which in the illustrated example is located in the control cabinet 25, though it may be located elsewhere, such as in the hoisting machine 21, in other implementations. The computing unit 26 is responsive to the signal provided by the acceleration sensor 17 which includes signal components caused by movement of the brake armature 2 or movement of other components of the hoisting machine due to wear. The signal is processed by the computing unit 26 in a predetermined way. Several alternative ways of predetermined processing are available for implementation in different implementations, such as:

A first alternative is that the computing unit 26 is configured to process the signal to detect an impact or an acceleration component caused by movement of the brake armature 2 or other parts of the hoisting machine and to send condition data based on the detected signal to a remote location 27. In that case a major part of the analyzing to determine the condition of the brake 16 is made at the remote location 27.

A second alternative is that the processing carried out by the computing unit 26 involves comparing a signal pattern or a frequency component of the signal to at least one reference signal pattern or reference frequency component stored in a memory. The memory may contain several alternative reference patterns or frequency components for use in the comparison, such as one for a brake determined to be in a full working condition, one for a brake determined to have a gap which is too wide, due to which maintenance is needed, and one for a bearing of the hoisting machine which is damaged due to wear. The frequency component may be determined by using a fast Fourier transformation or a discrete Fourier transformation, for instance. This way it may be possible to determine as an amplitude and/or a frequency of a frequency component characteristic for a condition where maintenance is required. The memory may be a part of the computing unit or a separate component. In that case the computing unit 26 has the capability to carry out analyzing, due to the comparison, to determine the condition of the hoisting machine. In that case the condition data sent by the computing unit may directly indicate the condition of the hoisting machine, in other word, data indicating whether or not maintenance work is needed.

In the second alternative, the condition data may be sent only in case the analyzing indicates that the brake or other parts of the hoisting machine requires maintenance work, in other words as an alarm to the remote location. The computing unit 26 may also be able to buffer condition data in the memory, due to which statistical data is obtained. In this way data may be collected for a longer time period before sending the condition data which includes statistical data obtained during a specific time period, for instance. This also makes it possible to trigger an alarm for maintenance only in case the statistical data indicates a problem over a longer time period.

The computing unit 26 may also obtain additional information from other components of the elevator system which it may utilize in processing of the signal from the acceleration sensor 17. One alternative is that the brake unit 23 controlling the operation of the brake 16, provides information to the computing unit 26 when it controls the brake armature 2 to move. This simplifies detection of brake armature movement 2 from the signal from the acceleration sensor, as the moments when such movement occurs is known.

The brake unit 23 of FIG. 2 may include several similar brakes 16 which are operated together to reduce speed of the elevator car 18, as needed. Each brake may include an own separate acceleration sensor or alternatively one single acceleration sensor in another part the hoisting machine may be sufficient.

In the example of FIG. 2 it is assumed that the brake control circuit 24 is capable of separately controlling each brake, by activating it into the brake position to brake and deactivating it into the release position, according to the current need. In order to obtain condition data for all brakes of the brake unit 23, the brake control circuit 24 is configured to control the brakes 16 to move their brake armatures 2 in turns, at least during predetermined test time periods or elevator car runs, in order to provide condition data where information originating from the separate brakes 16 can be identified. This makes it possible to via the condition data determine which or how many of the brakes 16 need maintenance, for instance.

The computing unit 24 is provided with a communication circuit having an interface to a communication system 28 for sending the condition data. In the example of FIG. 2 it is assumed that the interface provides a connection to a base station 29 of a cellular communication system, in other words as a wireless interface, though in other implementations a wired solution is possible. Via this interface the condition data is forwarded to a monitoring system of the elevator system, which is at a remote location 27. In this example, the term remote location refers to another location than the installation site of the hoisting machine 21. The monitoring system at the remote location 27 may be implemented as a server computer with a memory and running a software, which receives the condition data and stores it in the memory for access by maintenance personnel. One alternative is also to utilize a cloud service. Said remote monitoring system may be common to several elevators disposed in different geographical locations.

The stored condition data may be accessed by maintenance personnel via wireless terminals 30 or wired terminals 31 from the monitoring system at the remote location. Alternatively or additionally, the monitoring system at the remote location 27 may be configured to trigger transmission of al alarm to one or more terminals 30 or 31 of maintenance personnel in case a need for maintenance of a hoisting machine 21 in the elevator system is detected.

Maintenance of hoisting machines in the elevator system of FIG. 2 is simplified with the described solution, as it is no longer necessary for maintenance personnel to travel to the elevator installation of an elevator in order to measure the size of the air gap of the brake or to check the other components of the hoisting machine in order to determine whether or not maintenance work is needed. Instead this information can be obtained from the condition data sent by the computing unit, which is accessible from the remote location 27, as explained above. This significantly simplifies the maintenance work of the hoisting machine. The components, including the acceleration sensor and the computing unit can be retrofitted to existing elevator installations, after which they are capable of sending condition data to the remote location.

Figure 3:
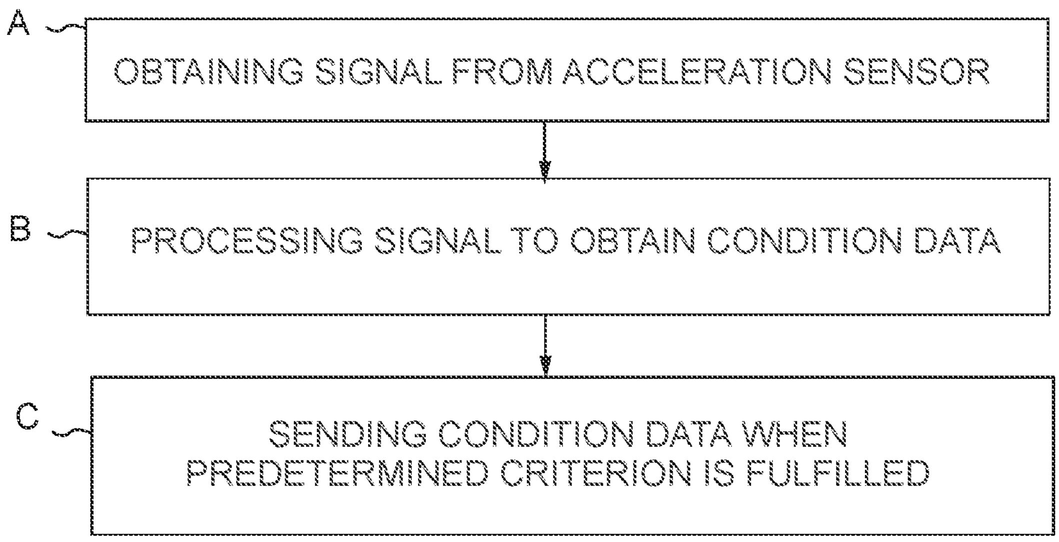
FIG. 3 is a flow diagram of a method which can be implemented in the elevator system of FIG. 2.

FIG. 3 is a flow diagram of a method which can be implemented in the elevator system of FIG. 2.

In step A a signal is obtained from an acceleration sensor 17 connected to a hoisting machine 21 of an elevator car during operation of the elevator car.

In step B the signal is processed to obtain condition data of the hoisting machine. In some implementations the processing of the signal may comprise comparison of a signal pattern or a frequency component of the signal to at least one reference signal pattern or reference frequency component stored in a memory or rate of change of successive frequency components such that, is said component changes faster than accepted, maintenance need may be determined. In this way, in case the pattern or frequency component of the signal matches a pattern or frequency component stored in the memory, the condition of the hoisting machine can be determined and data indicating the condition can be included in the condition data. The memory preferably contains several alternative patterns or frequency components for use in the comparison, such as one for a brake determined to be in a full working condition, one for a brake determined to have a gap which is too wide, due to which maintenance is needed, and one for a bearing in the hoisting machine which is determined to be worn out.

In step C condition data is sent to a remote location, when the result of the processing fulfils at least one predetermined criterion. In some implementations the sending of the condition data may include transmitting the condition data via a communication system 28 to a monitoring unit at a remote location from an installation site of the elevator car 18.

The criterion on when to send condition data to a remote location may vary. A first possible criterion is to send a signal due to detection of movement of the brake armature or when a worn out bearing of the hoisting machine is detected. A second possible criterion is that that a predetermined time period has passed since sending of previous condition data, such that a statistic indicating the operation of the hoisting machine during this time period may be sent at once in the condition data. A third possible criterion is that processing of the signal indicates that the brake or other parts of the hoisting machine needs maintenance.

Though not necessary in all implementations, the method of FIG. 3 may additionally include a method step comprising analyzing of the sent condition data at a monitoring unit, and triggering an indication of a maintenance need by the monitoring unit when needed based on the analysis. Such a solution is very efficient, as with such a solution service personnel may automatically receive an indication of a maintenance need for a hoisting machine 21 of the elevator system to a terminal 30 or 31, such as to a computer, to a portable data assistant or a to mobile phone.

It is to be understood that the above description and the accompanying figures are only intended to illustrate the present invention. It will be obvious to a person skilled in the art that the invention can be varied and modified without departing from the scope of the invention.

The invention claimed is:

1. An elevator system, comprising:

an elevator car;

a hoisting machine moving the elevator car in a hoistway;

an acceleration sensor connected to the hoisting machine; and a computing unit, being responsive to a signal provided by the acceleration sensor and sending condition data based on a predetermined processing of the signal, wherein the hoisting machine comprises a brake unit with several separate brakes operated together to reduce a speed of the elevator car, wherein the elevator system comprises a brake control circuit separately controlling the brakes into a brake position and into a release position, and wherein the brake control circuit is configured to control the brakes to move their brake armatures in turns to provide condition data where information originating from the separate brakes is identified.

2. The elevator system according to claim 1, wherein the hoisting machine comprises a brake having a brake armature moving into a brake position to reduce a speed of the elevator car in the hoistway when activated to brake, and moving into a release position when deactivated, and wherein the computing unit is responsive to a signal provided by the acceleration sensor when the brake armature moves.

3. The elevator system according to claim 2, wherein the processing of the signal by the computing unit involves comparing a signal pattern or a frequency component of the signal to at least one reference signal pattern or reference frequency component stored in a memory.

4. The elevator system according to claim 2, wherein the computing unit is configured to process the signal to detect an impact or an acceleration.

5. The elevator system according to claim 2, wherein the condition data sent by the computing unit contains statistical data obtained over a predetermined time period by processing of the signal from the acceleration sensor.

6. The elevator system according to claim 1, wherein the processing of the signal by the computing unit involves comparing a signal pattern or a frequency component of the signal to at least one reference signal pattern or reference frequency component stored in a memory.

7. The elevator system according to claim 6, wherein the computing unit is configured to process the signal to detect an impact or an acceleration.

8. The elevator system according to claim 6, wherein the condition data sent by the computing unit contains statistical data obtained over a predetermined time period by processing of the signal from the acceleration sensor.

9. The elevator system according to claim 1, wherein the computing unit is configured to process the signal to detect an impact or an acceleration.

10. The elevator system according to claim 1, wherein the condition data sent by the computing unit contains statistical data obtained over a predetermined time period by processing of the signal from the acceleration sensor.

11. The elevator system according to claim 1, wherein the computing unit comprises a communication circuit with an interface to a communication system for sending the condition data to a remote location.

12. The elevator system according to claim 11, wherein the elevator system comprises at said remote location a monitoring system receiving the condition data from the computing unit via the communication system.

13. The elevator system according to claim 12, wherein the monitoring system at the remote location analyses the received condition data and triggers an indication of a maintenance need based on the analysis.

14. A method of monitoring an elevator system, wherein the method comprises:

obtaining a signal from an acceleration sensor connected to a hoisting machine of an elevator car;

processing the signal to obtain condition data;

sending the condition data when the result of the processing fulfils at least one predetermined criterion, and separately controlling, using a brake control unit controlling a brake unit with several brakes operated together to reduce a speed of the elevator, the brakes into a brake position and into a release position, and controlling the brakes to move their brake armatures in turns to provide condition data where information originating from the separate brakes is identified.

15. The method of claim 14, wherein the acceleration sensor is connected to a brake of the hoisting machine to provide a signal during movement of a brake armature of the brake.

16. The method according to claim 14, wherein the processing of the signal comprises comparison of a signal pattern or a frequency component of the signal to at least one reference signal pattern or reference frequency component stored in a memory.

17. The method according to claim 14, wherein the sending of the condition data includes sending the condition data via a communication system to a monitoring unit at a remote location from an installation site of the elevator car.

18. The method according to claim 14, wherein the method further comprises:

analyzing of the sent condition data with a monitoring unit at a remote location; and triggering an indication of a maintenance need by the monitoring unit based on the analysis.

19. The method according to claim 18, wherein the triggering of an indication of a maintenance need involves sending a message via a communication system to a terminal of maintenance personnel.

* * * * *